(12) United States Patent
Matsumoto et al.

(10) Patent No.: US 8,170,170 B2
(45) Date of Patent: May 1, 2012

(54) CARRIER SYNCHRONIZING CIRCUIT AND CARRIER SYNCHRONIZING METHOD

(75) Inventors: Hideyuki Matsumoto, Tokyo (JP); Tetsuhiro Futami, Kanagawa (JP); Koji Naniwada, Tokyo (JP); Yuichi Hirayama, Chiba (JP)

(73) Assignee: Sony Corporation, Tokyo (JP)

( * ) Notice: Subject to any disclaimer, the term of this patent is extended or adjusted under 35 U.S.C. 154(b) by 1049 days.

(21) Appl. No.: 12/104,817

(22) Filed: Apr. 17, 2008

(65) Prior Publication Data

US 2008/0260086 A1   Oct. 23, 2008

(30) Foreign Application Priority Data

Apr. 20, 2007 (JP) ............................. P2007-111328

(51) Int. Cl.
*H03D 3/24* (2006.01)
(52) U.S. Cl. ........ 375/373; 370/516; 327/147; 327/156; 455/180.3; 455/260
(58) Field of Classification Search .................. 375/373; 370/516; 327/147, 156; 455/180.3, 260
See application file for complete search history.

(56) References Cited

U.S. PATENT DOCUMENTS

| 4,091,331 | A | * | 5/1978 | Kaser et al. | 375/362 |
| 5,440,268 | A | * | 8/1995 | Taga et al. | 329/308 |
| 5,450,447 | A | * | 9/1995 | Dutta | 375/344 |
| 5,909,148 | A | * | 6/1999 | Tanaka | 331/2 |
| 6,023,491 | A | * | 2/2000 | Saka et al. | 375/326 |
| 6,191,649 | B1 | * | 2/2001 | Sugita et al. | 329/304 |
| 7,263,059 | B2 | * | 8/2007 | Katoh et al. | 370/206 |
| 2004/0196915 | A1 | * | 10/2004 | Gupta | 375/260 |

FOREIGN PATENT DOCUMENTS

| JP | 10 126455 | 5/1998 |
| JP | 2002 111768 | 4/2002 |

* cited by examiner

*Primary Examiner* — Shuwang Liu
*Assistant Examiner* — Sung Ahn
(74) *Attorney, Agent, or Firm* — Frommer Lawrence & Haug LLP; William S. Frommer; Paul A. Levy

(57) ABSTRACT

Disclosed herein is a carrier synchronizing circuit including at least frequency synchronizing means and phase synchronizing means. The phase synchronizing means includes residual frequency error detecting means for detecting a residual frequency error after a frequency synchronizing process by the frequency synchronizing means and supplying the residual frequency error to the frequency synchronizing means, and the frequency synchronizing means performs frequency pull-in for the residual frequency error supplied from the residual frequency error detecting means after first timing.

8 Claims, 5 Drawing Sheets

RELATED ART

CARRIER SYNCHRONIZING CIRCUIT AND CARRIER SYNCHRONIZING METHOD

CROSS REFERENCES TO RELATED APPLICATIONS

The present invention contains subject matter related to Japanese Patent Application JP 2007-111328 filed with the Japan Patent Office on Apr. 20, 2007, the entire contents of which being incorporated herein by reference.

BACKGROUND OF THE INVENTION

1. Field of the Invention

The present invention relates to a carrier synchronizing circuit and a carrier synchronizing method, and particularly to a carrier synchronizing circuit and a carrier synchronizing method that can quickly and stably establish synchronism with a carrier without degrading transmission quality even when a frequency drift in a local oscillator is large and even when the frequency detection accuracy of a frequency synchronizing unit is not very high.

2. Description of the Related Art

Recently remarkable progress has been made in wireless digital transmission technology including communication for portable telephones, satellite wave or terrestrial wave digital broadcasting, wireless LAN (Local Area Network) communication and the like. In a wireless digital signal transmission system, establishment and acquisition of stable synchronism with a carrier is very important for high transmission quality.

For establishment of synchronism, it is necessary to accurately detect a frequency difference between local oscillation frequency of a receiver (frequency of a local oscillator) and frequency of a carrier, that is, a frequency error $\Delta f$ of the local oscillator as well as a phase deviation $\theta$ caused by a transmission line, an RF (Radio Frequency) circuit of a sender and a receiver, and the like, and control the frequency and phase of a received signal in such a manner as to cancel each of the frequency error $\Delta f$ and the phase deviation $\theta$.

Although a PLL (Phase-Locked Loop) is often used as a typical example of a carrier synchronizing method, a range of frequency errors that can be cancelled by the PLL (capture range) is not very wide. Therefore, when a frequency error exceeds the capture range, another carrier synchronizing method having a wider capture range needs to be applied.

However, a trade-off relation generally holds such that when the capture range becomes wider, frequency error detection accuracy is roughened. Therefore, a method is often used which first roughly pulls in frequency to a frequency error in a certain range (that is, achieves frequency synchronism) by a synchronizing method having a wide capture range and then achieves final carrier synchronism (phase synchronism) including a phase component by a high-precision synchronizing method of a PLL or the like (see for example Japanese Patent Laid-Open No. Hei 10-126455, and Japanese Patent Laid-Open No. 2002-111768).

FIG. 1 is a block diagram showing an example of an existing carrier synchronizing circuit.

A carrier synchronizing circuit 1 includes a frequency synchronizing unit 2, a low-pass filter (LPF) 3, and a phase synchronizing unit 4. In this carrier synchronizing circuit 1, the frequency synchronizing unit 2 pulls in an input received signal to a frequency in a predetermined range. The low-pass filter 3 then removes a high-frequency component, thereby suppressing thermal noise outside a modulation band and interference of an adjacent channel or the like. The phase synchronizing unit 4 performs high-precision phase pull-in by a PLL or the like, whereby carrier synchronism is established.

The frequency synchronizing unit 2 and the phase synchronizing unit 4 will be described in more detail.

The frequency synchronizing unit 2 includes a frequency error detector (FD) 11, a numerically controlled oscillator (NCO) 12, and a multiplier 13.

The frequency error detector 11 is supplied with a signal after filter processing from the low-pass filter 3. The frequency error detector 11 detects a frequency error $\Delta f$ from the signal after the filter processing, and then outputs the frequency error $\Delta f$ to the numerically controlled oscillator 12. A method is described in Non-Patent Document, U. Mengali and A. N. D' Andrea, Synchronization Techniques for Digital Receivers, Plenum Pub Corp Published 1997/11, "Chapter 3" for example. The method above or the like can be used as a method for detecting the frequency error $\Delta f$ in the frequency error detector 11. The numerically controlled oscillator 12 generates a phase rotator $e^{j2\pi\Delta ft}$ (the signal of the phase rotator $e^{j2\pi\Delta ft}$) having the frequency error $\Delta f$ from the frequency error detector 11 as a period, and then outputs the phase rotator $e^{j2\pi\Delta ft}$ (the signal of the phase rotator $e^{j2\pi\Delta ft}$) to the multiplier 13.

The multiplier 13 multiplies the received signal input to the frequency synchronizing unit 2 by a complex conjugate (the signal of the complex conjugate) of the phase rotator $e^{j2\pi\Delta ft}$ output from the numerically controlled oscillator 12.

Thus, in the frequency synchronizing unit 2, the frequency error $\Delta f$ of the signal obtained by subjecting the received signal after frequency synchronizing processing to the filter processing is detected, and the phase rotator $e^{j2\pi\Delta ft}$ having the frequency error $\Delta f$ as a period is generated. Then, the complex conjugate of the generated phase rotator $e^{j2\pi\Delta ft}$ is multiplied by the received signal, whereby phase rotation of the received signal which phase rotation is caused by the frequency error $\Delta f$ is cancelled out.

The phase synchronizing unit 4 includes a phase error detector (PD) 21, a loop filter 22, a numerically controlled oscillator (NCO) 23, and a multiplier 24.

The phase error detector 21 detects a phase error of a signal output by the multiplier 24, and then outputs the phase error to the loop filter 22. In this case, letting $\Delta f'$ be a frequency error remaining after the frequency synchronizing processing in the frequency synchronizing unit 2, and letting $\theta$ be phase deviation occurring in a transmission line, an RF circuit of a sender and a receiver, and the like, the phase error detected by the phase error detector 21 can be expressed as $(2\pi\Delta f't+\theta)$.

The loop filter 22 is an IIR (Infinite Impulse Response) type loop filter. The loop filter 22 averages the phase error $(2\pi\Delta f't+\theta)$ output by the phase error detector 21, and then outputs the result to the numerically controlled oscillator 23.

More specifically, the loop filter 22 includes multipliers 31 and 32, an integrator 33, a delay element 34, and an adder 35. First, the multiplier 31 or 32 multiplies the phase error $(2\pi\Delta f't+\theta)$ (the signal of the phase error $(2\pi\Delta f't+\theta)$) output from the phase error detector 21 by g1 or g2, respectively. That is, the multiplier 31 or 32 is a weighting multiplier that adds the weight of the coefficient g1 or g2, respectively, to the input signal.

The integrator 33 adds the phase error $(2\pi\Delta f't+\theta)$ multiplied by g2, which phase error is the output of the multiplier 32, to an output of the integrator 33 which output precedes by one symbol period and is an output of the delay element 34. The integrator 33 then outputs the result to the delay element 34 and the adder 35. The delay element 34 delays (retains) the output from the integrator 33 by one symbol period, and then outputs the delayed output to the integrator 33. The adder 35 adds the output of the multiplier 31 to the output of the integrator 33, and then outputs the result to the numerically controlled oscillator 23.

The numerically controlled oscillator 23 generates a phase rotator $e^{j(2\pi\Delta f't+\theta)}$ of a phase quantity corresponding to the phase error $(2\pi\Delta f't+\theta)$ output by the loop filter 22, and then outputs the phase rotator $e^{j(2\pi\Delta f't+\theta)}$ to the multiplier 24. The multiplier 24 multiplies the received signal after the filter processing which signal is output by the low-pass filter 3 by a complex conjugate (the signal of the complex conjugate) of the phase rotator $e^{j(2\pi\Delta f't+\theta)}$ output from the numerically controlled oscillator 23.

Thus, in the phase synchronizing unit 4, the phase error $(2\pi\Delta f't+\theta)$ of the signal obtained by subjecting the received signal after the frequency synchronizing processing to the filter processing is detected and averaged. Then, the complex conjugate (the signal of the complex conjugate) of the phase error $(2\pi\Delta f't+\theta)$ after the averaging is multiplied by the received signal output from the low-pass filter 3, whereby the phase error $(2\pi\Delta f't+\theta)$ included in the received signal is cancelled out.

By using the carrier synchronizing circuit including the frequency synchronizing unit and the phase synchronizing unit independently as described above, it is possible to establish carrier synchronism with reliability and high precision even when there is a relatively large frequency error.

SUMMARY OF THE INVENTION

However, when the local oscillator is subjected to a wide range of temperature changes because the receiver (or an RF circuit part) is installed outdoors, for example, the oscillation frequency of a signal output by the local oscillator also drifts over a wide range due to a temperature-dependent characteristic of the oscillator. In this case, because the speed of temperature change is not very high, it is possible to sufficiently follow a frequency drift by the acquisition capability of the PLL. However, because the frequency compensation of the phase synchronizing unit is after a band limitation by the LPF, a signal loss after the band limitation due to the frequency drift is inevitable. Hence, when a drift range reaches a band that cannot be ignorable as compared with a modulation band, degradation in transmission quality due to the signal loss becomes noticeable.

In addition, in a case where the frequency detection accuracy of the frequency synchronizing unit in the preceding stage is not very high as compared with the modulation band, no matter how high the accuracy of the pulling in of a residual frequency error by the phase synchronizing unit in the subsequent stage is, the signal loss due to the band limitation in the middle stage cannot be compensated either. A BER (Bit Error Rate) characteristic is therefore degraded inevitably.

The present invention has been made in view of such a situation. It is desirable to quickly and stably establish synchronism with a carrier without degrading transmission quality even when the local oscillator has a large frequency drift and even when the frequency detection accuracy of the frequency synchronizing unit is not very high.

According to an embodiment of the present invention, there is provided a carrier synchronizing circuit including at least frequency synchronizing means and phase synchronizing means. The phase synchronizing means includes residual frequency error detecting means for detecting a residual frequency error after a frequency synchronizing process by the frequency synchronizing means and supplying the residual frequency error to the frequency synchronizing means, and the frequency synchronizing means performs frequency pull-in for the residual frequency error supplied from the residual frequency error detecting means after first timing.

The phase synchronizing means can further include convergence state determining means for determining a convergence state of phase pull-in on a basis of the residual frequency error detected by the residual frequency error detecting means. The frequency synchronizing means can include frequency pull-in control means for obtaining a result of determination of the convergence state determining means, and determining whether to perform frequency pull-in for the residual frequency error, and weighting means for adding a predetermined weight to the residual frequency error supplied from the residual frequency error detecting means. The frequency pull-in control means can make frequency pull-in for the residual frequency error weighted by the weighting means performed after the first timing in which the result of determination indicating that the residual frequency error has converged is obtained.

The frequency pull-in control means can also obtain the residual frequency error detected by the residual frequency error detecting means, and make frequency pull-in for the residual frequency error weighted by the weighting means performed from a time when the result of determination indicating that the residual frequency error has converged is obtained and the residual frequency error detected by the residual frequency error detecting means becomes equal to or more than a first threshold value to a time when the residual frequency error detected by the residual frequency error detecting means becomes equal to or less than a second threshold value equal to or less than the first threshold value.

The frequency synchronizing means can further perform frequency pull-in for the residual frequency error supplied from the residual frequency error detecting means in second timing before the first timing, when frequency pull-in for the residual frequency error is performed in the second timing, the frequency pull-in control means can make frequency pull-in for the residual frequency error not weighted by the weighting means performed, and the phase synchronizing means can perform phase error initialization until the frequency pull-in started in the second timing is completed.

According to an embodiment of the present invention, there is provided a carrier synchronizing method of a carrier synchronizing circuit, the carrier synchronizing circuit including at least frequency synchronizing means and phase synchronizing means. The carrier synchronizing method includes the steps of: in the phase synchronizing means, detecting a residual frequency error after frequency synchronization by the frequency synchronizing means and supplying the residual frequency error to the frequency synchronizing means; and in the frequency synchronizing means, performing frequency pull-in for the residual frequency error supplied from the phase synchronizing means after predetermined timing.

In one embodiment of the present invention, the phase synchronizing means detects a residual frequency error after frequency synchronization by the frequency synchronizing means, and the frequency synchronizing means performs frequency pull-in for the residual frequency error supplied from the phase synchronizing means after predetermined timing.

According to one embodiment of the present invention, it is possible to quickly and stably establish synchronism with a carrier without degrading transmission quality even when the local oscillator has a large frequency drift and even when the frequency detection accuracy of the frequency synchronizing unit is not very high.

DETAILED DESCRIPTION OF THE PREFERRED EMBODIMENTS

Preferred embodiments of the present invention will hereinafter be described. Correspondences between constitutional requirements of the present invention and embodiments described in the specification or the drawings are illustrated as follows. This description is to confirm that embodiments supporting the present invention are described in the specification or the drawings. Therefore, even when there is an embodiment described in the specification or drawings but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Figure 2:
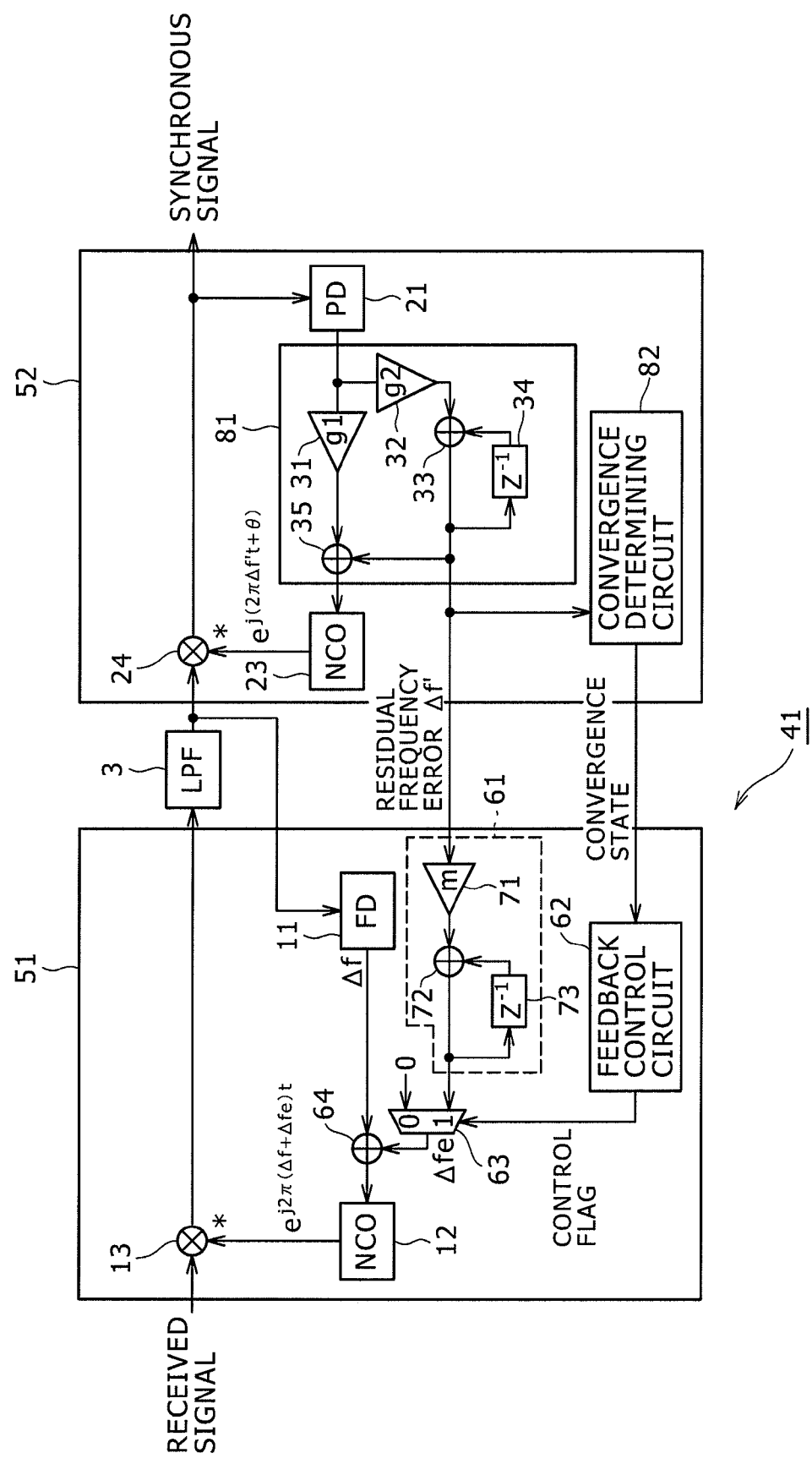
FIG. 2 is a block diagram showing an example of configuration of a first embodiment of a carrier synchronizing circuit to which the present embodiment is applied.

A carrier synchronizing circuit according to a first embodiment of the present invention is a carrier synchronizing circuit (for example a carrier synchronizing circuit 41 in FIG. 2) including at least frequency synchronizing means (for example a frequency synchronizing unit 51 in FIG. 2) and phase synchronizing means (for example a phase synchronizing unit 52 in FIG. 2). The phase synchronizing means includes residual frequency error detecting means (for example a loop filter 81 in FIG. 2) for detecting a residual frequency error after a frequency synchronizing process by the frequency synchronizing means and supplying the residual frequency error to the frequency synchronizing means, and the frequency synchronizing means performs frequency pull-in for the residual frequency error supplied from the residual frequency error detecting means after first timing.

The phase synchronizing means further includes convergence state determining means (for example a convergence determining circuit 82 in FIG. 2) for determining a convergence state of phase pull-in on a basis of the residual frequency error detected by the residual frequency error detecting means. The frequency synchronizing means includes frequency pull-in control means (for example a feedback control circuit 62 in FIG. 2) for obtaining a result of determination of the convergence state determining means, and determining whether to perform frequency pull-in for the residual frequency error. The frequency synchronizing means further includes weighting means (for example a weighting integrator circuit 61 in FIG. 2) for adding a predetermined weight to the residual frequency error supplied from the residual frequency error detecting means. The frequency pull-in control means makes frequency pull-in for the residual frequency error weighted by the weighting means performed after the first timing in which the result of determination indicating that the residual frequency error has converged is obtained.

Preferred embodiments of the present invention will hereinafter be described with reference to the drawings.

FIG. 2 shows an example of configuration of a first embodiment of a carrier synchronizing circuit to which the present embodiment is applied.

Figure 1:
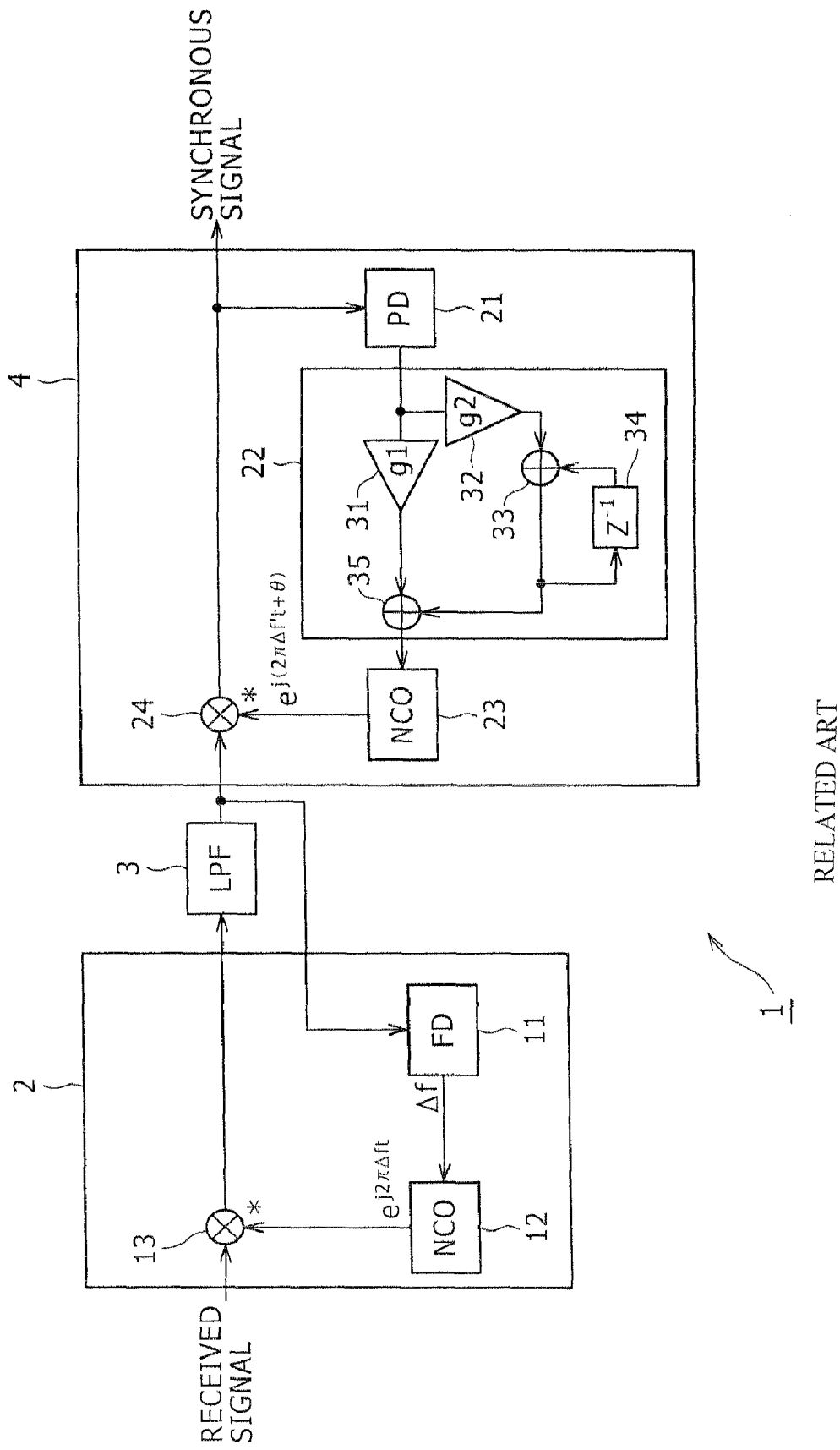
FIG. 1 is a block diagram showing an example of an existing carrier synchronizing circuit.

Incidentally, in FIG. 2, parts corresponding to those of the carrier synchronizing circuit 1 described with reference to FIG. 1 are identified by the same reference numerals, and description thereof will be omitted as appropriate.

A carrier synchronizing circuit 41 in FIG. 2 includes a frequency synchronizing unit 51, a low-pass filter (LPF) 3, and a phase synchronizing unit 52.

The frequency synchronizing unit 51 includes a frequency error detector (FD) 11, a numerically controlled oscillator (NCO) 12, a multiplier 13, a weighting integrator circuit 61, a feedback control circuit 62, a selector circuit 63, and an adder 64. Thus, the frequency synchronizing unit 51 is different from the frequency synchronizing unit 2 in FIG. 1 in that the frequency synchronizing unit 51 is newly provided with the weighting integrator circuit 61, the feedback control circuit 62, the selector circuit 63, and the adder 64. Incidentally, the weighting integrator circuit 61 has a multiplier 71, an integrator 72, and a delay element 73.

On the other hand, the phase synchronizing unit 52 includes a phase error detector (PD) 21, a numerically controlled oscillator (NCO) 23, a multiplier 24, a loop filter 81, and a convergence determining circuit 82. Thus, the phase synchronizing unit 52 is different from the phase synchronizing unit 4 in FIG. 4 in that the phase synchronizing unit 52 is provided with the loop filter 81 in place of the loop filter 22 and is newly provided with the convergence determining circuit 82.

A residual frequency error Δf' after frequency pull-in in the frequency synchronizing unit 51 is supplied from the loop filter 81 in the phase synchronizing unit 52 to the weighting integrator circuit 61 in the frequency synchronizing unit 51. The residual frequency error Δf' is input to the multiplier 71.

The multiplier 71 multiplies the residual frequency error Δf' from the loop filter 81 by a weighting factor m, and then outputs the result to the integrator 72. The integrator 72 adds together the output of the multiplier 71 and an output from the integrator 72 which output precedes by one symbol period and is an output of the delay element 73, and then outputs a weighted integrated value Δfe of the residual frequency error Δf' as a result of the addition to the selector circuit 63 and the delay element 73. The delay element 73 delays (retains) the weighted integrated value Δfe as the output from the integrator 72 by one symbol period, and then outputs the weighted integrated value Δfe to the integrator 72.

The feedback control circuit 62 outputs "0" or "1" as a control flag to the selector circuit 63 according to a convergence state supplied from the convergence determining circuit 82 in the phase synchronizing unit 52. As will be described later, either "0", "1", "2", or "3" is supplied as the convergence state from the convergence determining circuit 82 according to the convergence state of the residual frequency error Δf'. When the convergence state supplied from the convergence determining circuit 82 is "3", the feedback control circuit 62 outputs a control flag "1" to the selector circuit 63. When the other convergence states are supplied from the convergence determining circuit 82, the feedback control circuit 62 outputs a control flag "0" to the selector circuit 63.

The selector circuit 63 outputs either "0" or the weighted integrated value Δfe to the adder 64 according to the control flag supplied from the feedback control circuit 62. More specifically, when the control flag supplied from the feedback control circuit 62 is "0", the selector circuit 63 outputs "0" to the adder 64. When the control flag supplied from the feedback control circuit 62 is "1", the selector circuit 63 outputs the weighted integrated value Δfe from the integrator 72 to the adder 64.

As will be described later, when the feedback control circuit 62 outputs the control flag "1" to the selector circuit 63, the frequency synchronizing unit 51 performs frequency pull-in for the residual frequency error Δf' in the phase synchronizing unit 52. However, when the residual frequency error Δf' supplied from the phase synchronizing unit 52 is to be pulled in at a time, the PLL of the phase synchronizing unit 52 cannot respond sufficiently, and thus transmission quality is degraded. Therefore the weighted integrated value Δfe obtained by controlling (slowing) a pull-in rate of the residual frequency error Δf' by the weighting factor m by the weighting integrator circuit 61 is output to the adder 64.

The adder 64 adds together the output of the selector circuit 63 and the output of the frequency error detector 11, and then outputs the result to the numerically controlled oscillator 12. Hence, when "0" is output from the selector circuit 63, the weighting integrator circuit 61 is nullified. The configuration of the frequency synchronizing unit 51 at the time is similar to that of the frequency synchronizing unit 2 in FIG. 1. On the other hand, when the weighted integrated value Δfe is output from the selector circuit 63, the adder 64 outputs a frequency error (Δf+Δfe) to the numerically controlled oscillator 12.

The loop filter 81 in the phase synchronizing unit 52 has a similar configuration to that of the loop filter 22 in FIG. 1, but is different from the loop filter 22 in FIG. 1 only in that the loop filter 81 outputs the residual frequency error Δf' as the output result of an integrator 33 to the multiplier 71 in the frequency synchronizing unit 51 and the convergence determining circuit 82.

The convergence determining circuit 82 monitors an amount of variation in the residual frequency error Δf' at predetermined time intervals T, generates the convergence state "0", "1", "2", or "3" according to the following criteria, and then outputs the convergence state to the feedback control circuit 62.

When a1<Δf'(t+T)−Δf'(t), Convergence State="0"
When a2<Δf'(t+T)−Δf'(t)≦a1, Convergence State="1"
When a3<Δf'(t+T)−Δf'(t)≦a2, Convergence State="2"
When Δf'(t+T)−Δf'(t)≦a3, Convergence State="3"

where a1, a2, and a3 are fixed values satisfying a3<a2<a1.

That is, the convergence determining circuit 82 outputs the convergence state "0" to the feedback control circuit 62 when a difference Δf'(t+T)−Δf'(t) between a residual frequency error Δf'(t) at a predetermined time t and a residual frequency error Δf'(t+T) at a time (t+T) after the passage of a time T from the time t is more than the predetermined value a1. The convergence determining circuit 82 outputs the convergence state "1" to the feedback control circuit 62 when the difference Δf'(t+T)−Δf'(t) is more than the predetermined value a2 and equal to or less than the predetermined value a1. The convergence determining circuit 82 outputs the convergence state "2" to the feedback control circuit 62 when the difference Δf'(t+T)−Δf'(t) is more than the predetermined value a3 and equal to or less than the predetermined value a2. The convergence determining circuit 82 outputs the convergence state "3" to the feedback control circuit 62 when the difference Δf'(t+T)−Δf'(t) is equal to or less than the predetermined value a3.

With the convergence of phase pull-in in the phase synchronizing unit 52, the residual frequency error Δf' also converges. Therefore the convergence state makes transitions from "0" to "1" to "2" to "3" with the passage of time.

Incidentally, the convergence determining circuit 82 may simply set the convergence state to "0", "1", "2", and "3" for output according to elapsed time after a start of phase pull-in without monitoring the residual frequency error Δf'.

The operation of the carrier synchronizing circuit 41 in FIG. 2 will next be described.

In an initial stage in which the input of a received signal into the frequency synchronizing unit 51 is started and a frequency synchronizing process is started by the frequency synchronizing unit 51, phase pull-in in the phase synchronizing unit 52 does not converge, and thus the convergence state supplied from the convergence determining circuit 82 to the feedback control circuit 62 is a value other than "3". The feedback control circuit 62 therefore supplies the control flag "0" to the selector circuit 63 to nullify the weighting integrator circuit 61.

Hence, the frequency synchronizing unit 51 is effectively of a similar configuration to that of the frequency synchronizing unit 2 in FIG. 1. The multiplier 13 multiplies the input received signal by a signal of a complex conjugate of a phase rotator $e^{j2\pi\Delta ft}$ output from the numerically controlled oscillator 12, and then outputs the result to the low-pass filter 3. Incidentally, as for the received signal input first (in a first symbol period), the multiplier 13 outputs the input received signal to the low-pass filter 3 as it is. The low-pass filter 3 subjects the signal supplied from the multiplier 13 to filter processing for removing a predetermined frequency band (high-frequency component). The low-pass filter 3 outputs the signal after the processing to the frequency error detector 11 in the frequency synchronizing unit 51 and the multiplier 24 in the phase synchronizing unit 52.

The frequency error detector 11 detects a frequency error Δf of the signal after the filter processing, and then outputs the frequency error Δf to the adder 64. The adder 64 adds the frequency error Δf and "0" together, and then outputs the result to the numerically controlled oscillator 12. That is, the adder 64 outputs the frequency error Δf to the numerically controlled oscillator 12 as it is. The numerically controlled oscillator 12 generates the phase rotator $e^{j2\pi\Delta ft}$ (the signal of the phase rotator $e^{j2\pi\Delta ft}$) having the frequency error Δf as a period, and then outputs the phase rotator $e^{j2\pi\Delta ft}$ (the signal of the phase rotator $e^{j2\pi\Delta ft}$) to the multiplier 13. Processing (loop) by the multiplier 13, the low-pass filter 3, the frequency error detector 11, and the numerically controlled oscillator 12 described above is repeated until the control flag "1" is supplied from the feedback control circuit 62 to the selector circuit 63.

Meanwhile, the multiplier 24 in the phase synchronizing unit 52 multiplies the signal after the filter processing from the low-pass filter 3 by a signal of a complex conjugate of a phase rotator $e^{j(2\pi\Delta f't+\theta)}$ output from the numerically controlled oscillator 23. The multiplier 24 outputs a result of the multiplication as a synchronous signal to a block in a subsequent stage, and also outputs the result of the multiplication to the phase error detector 21. Incidentally, as for the signal input first (in a first symbol period), the multiplier 24 outputs the input signal as it is.

The phase error detector 21 detects the phase error (2πΔf't+θ) of the signal output by the multiplier 24, and then outputs the phase error (2πΔf't+θ) to the loop filter 81. The loop filter 81 averages the phase error (2πΔf't+θ), and then outputs the result to the numerically controlled oscillator 23. In addition, the loop filter 81 outputs a residual frequency error Δf' to the convergence determining circuit 82 and the multiplier 71 in the frequency synchronizing unit 51.

The numerically controlled oscillator 23 generates the phase rotator $e^{j(2\pi\Delta f't+\theta)}$ of a phase quantity corresponding to the phase error $(2\pi\Delta f't+\theta)$, and then outputs the phase rotator $e^{j(2\pi\Delta f't+\theta)}$ to the multiplier 24.

In the phase synchronizing unit 52, processing (loop) by the multiplier 24, the phase error detector 21, the loop filter 81, and the numerically controlled oscillator 23 described above is repeated. Thereby, the convergence state corresponding to the residual frequency error $\Delta f'$ is sequentially supplied from the convergence determining circuit 82 to the feedback control circuit 62 in the frequency synchronizing unit 51. The convergence state supplied to the feedback control circuit 62 in an initial stage in which a phase synchronizing process is started is "0". With the passage of time, the convergence state makes a transition to "1" and to "2". Finally, the convergence state "3" is supplied from the convergence determining circuit 82 to the feedback control circuit 62.

When the convergence state "3" is supplied from the convergence determining circuit 82 to the feedback control circuit 62, the feedback control circuit 62 in the frequency synchronizing unit 51 supplies the control flag "1" to the selector circuit 63. The selector circuit 63 thus outputs a weighted integrated value $\Delta fe$ as output from the weighting integrator circuit 61 to the adder 64.

Then, in the loop of the multiplier 13, the low-pass filter 3, the frequency error detector 11, and the numerically controlled oscillator 12 described above, the adder 64 outputs, to the numerically controlled oscillator 12, a frequency error $(\Delta f+\Delta fe)$ obtained by adding the frequency error $\Delta f$ from the frequency error detector 11 to the weighted integrated value (frequency error) $\Delta fe$ from the selector circuit 63.

Next, the numerically controlled oscillator 12 generates a phase rotator $e^{j2\pi(\Delta f+\Delta fe)t}$ (the signal of the phase rotator $e^{j2\pi(\Delta f+\Delta fe)t}$) having the frequency error $(\Delta f+\Delta fe)$ as a period, and then outputs the phase rotator $e^{j2\pi(\Delta f+\Delta fe)t}$ (the signal of the phase rotator $e^{j2\pi(\Delta f+\Delta fe)t}$) to the multiplier 13. The multiplier 13 multiplies the received signal input to the frequency synchronizing unit 51 by a complex conjugate (the signal of the complex conjugate) of the phase rotator $e^{j2\pi(\Delta f+\Delta fe)t}$ output from the numerically controlled oscillator 12.

Hence, in the carrier synchronizing circuit 41 in FIG. 2, when the convergence state becomes "3", the frequency synchronizing unit 51 performs frequency pull-in for the frequency error $(\Delta f+\Delta fe)$, so that the residual frequency error in the phase synchronizing unit 52 is reduced by $\Delta fe$.

A residual frequency error $\Delta f'n$ after the passage of a time n from a start of frequency pull-in by the feedback loop in which the residual frequency error $\Delta f'$ is fed back to the frequency synchronizing unit 51 can be expressed by the following Equation (1).

$$\Delta f'n = (1-m)^n \Delta f'_s \quad (1)$$

where the residual frequency error $\Delta f'_s$ is the residual frequency error of the phase synchronizing unit 52 immediately before the start of the frequency pull-in for the residual frequency error $\Delta f'$ by the feedback loop, and the time n (n=0, 1, 2, ... ) represents a time with a symbol period as a unit. The coefficient m is the weight factor in the multiplier 71.

According to Equation (1), the residual frequency error $\Delta f'n$ exponentially converges to zero with the passage of the time n.

In addition, as is understood from Equation (1), the pull-in rate of the residual frequency error $\Delta f'$ from the phase synchronizing unit 52 can be set arbitrarily by changing the weighting factor m of the multiplier 71.

Figure 3:
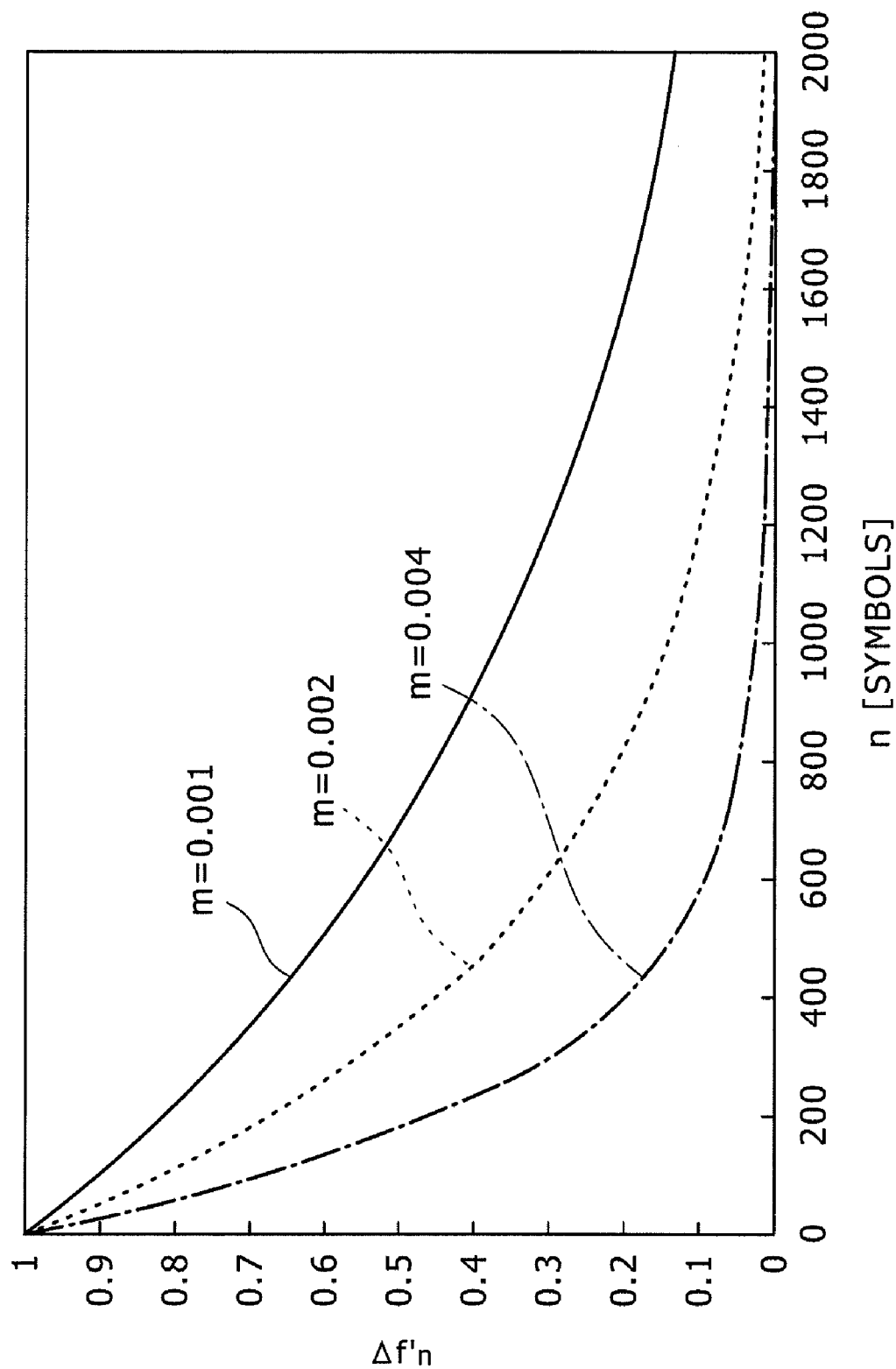
FIG. 3 is a diagram showing a residual frequency error $\Delta f_n$ when various weighting factors m are given.

FIG. 3 shows the residual frequency error $\Delta f'n$ when the weighting factor m of the multiplier 71 is set to 0.001, 0.002, or 0.004.

An axis of abscissas in FIG. 3 indicates the time n with a symbol period as a unit, and an axis of ordinates indicates the residual frequency error $\Delta f'_n$. Incidentally, in FIG. 3, the residual frequency error $\Delta f'_n$ is indicated with $\Delta f'_s$ as a reference (1).

FIG. 3 indicates that the pull-in rate of the residual frequency error $\Delta f'$ can be slowed as the weighting factor m is decreased.

As described above, according to the carrier synchronizing circuit 41 in FIG. 2, by feeding back the residual frequency error $\Delta f'$ in the phase synchronizing unit 52 to the frequency synchronizing unit 51, frequency pull-in for the residual frequency error $\Delta f'$ can be performed in the stage preceding the low-pass filter 3, that is, in the frequency synchronizing unit 51. Therefore, even in cases of a large frequency drift in the local oscillator and a relatively large frequency detection error in the frequency synchronizing unit 51 (in a case where the frequency detection accuracy of the frequency synchronizing unit 51 is not very high), it is possible to eliminate a signal loss in the low-pass filter 3, and thus improve transmission quality.

Further, according to the carrier synchronizing circuit 41, by controlling the pull-in rate using the weighting factor m rather than pulling in the residual frequency error $\Delta f'$ at a time, it is possible to pull in the residual frequency error $\Delta f'$ without hindering acquisition of the PLL. Thus stable transmission quality can be ensured even in the pull-in process.

Figure 4:
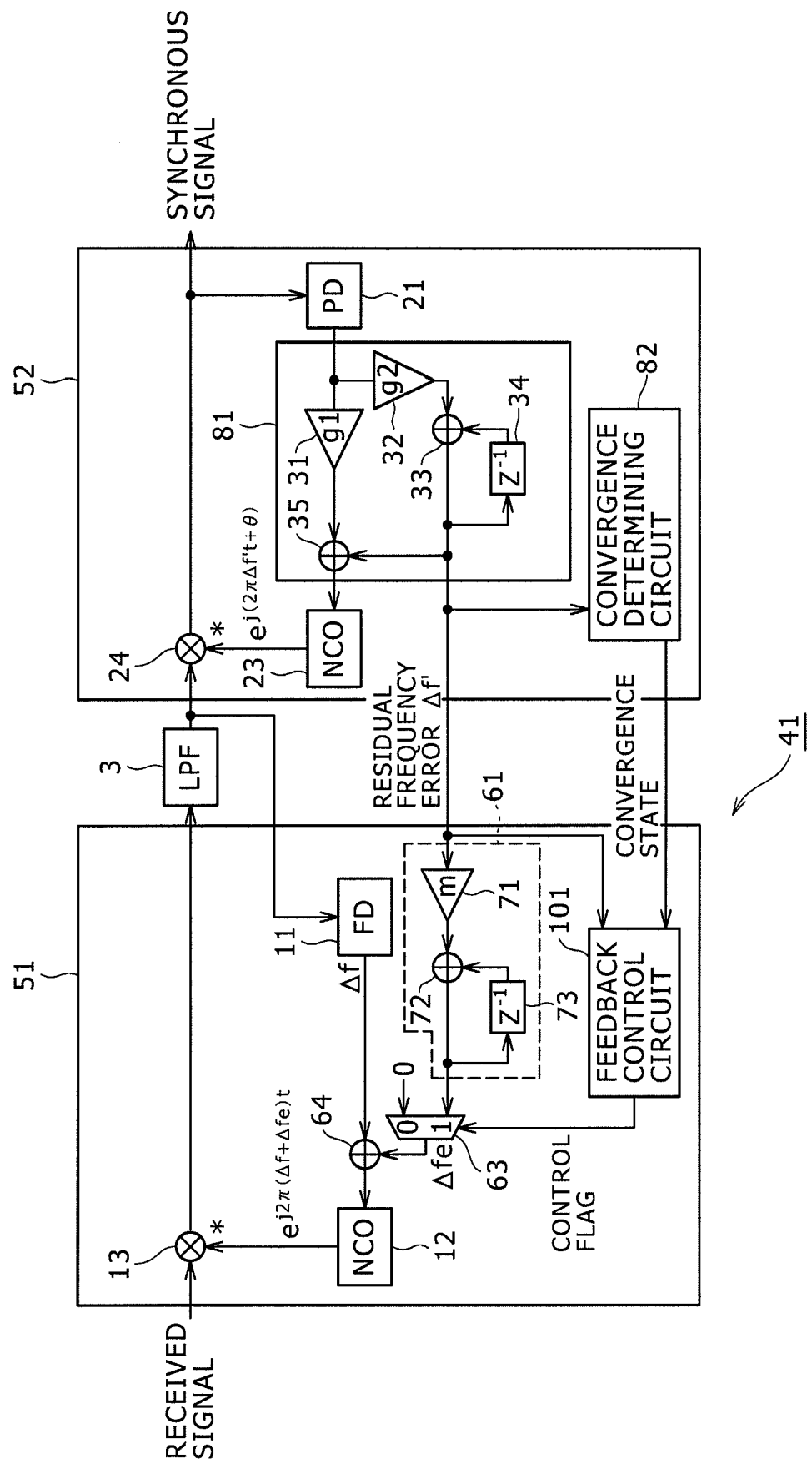
FIG. 4 is a block diagram showing an example of configuration of a second embodiment of a carrier synchronizing circuit to which the present embodiment is applied.

FIG. 4 shows an example of configuration of a second embodiment of a carrier synchronizing circuit to which the present embodiment is applied.

In FIG. 4, parts corresponding to those of the carrier synchronizing circuit 41 shown in FIG. 2 are identified by the same reference numerals, and description thereof will be omitted as appropriate.

The carrier synchronizing circuit 41 of FIG. 4 is different from the carrier synchronizing circuit 41 shown in FIG. 2 in that the carrier synchronizing circuit 41 of FIG. 4 has a feedback control circuit 101 in place of the feedback control circuit 62 and in that a loop filter 81 in a phase synchronizing unit 52 supplies a residual frequency error $\Delta f'$ to not only a multiplier 71 and a convergence determining circuit 82 but also the feedback control circuit 101.

The feedback control circuit 101 internally stores a start threshold value Th1, which is a threshold value for starting pulling in the residual frequency error $\Delta f'$, and an end threshold value Th2, which is a threshold value for ending the pulling in of the residual frequency error $\Delta f'$ (Th2≦Th1). The feedback control circuit 101 determines a control flag according to not only the condition based on the above-described convergence state but also the value of the residual frequency error $\Delta f'$. The feedback control circuit 101 then outputs the control flag to a selector circuit 63.

More specifically, the feedback control circuit 101 outputs the control flag "1" to the selector circuit 63 (changes to the control flag "1") when the convergence state from the convergence determining circuit 82 is "3" and the residual frequency error $\Delta f'$ becomes equal to or more than the start threshold value Th1. When the residual frequency error $\Delta f'$ becomes equal to or less than the end threshold value Th2, the feedback control circuit 101 outputs the control flag "0" to the selector circuit 63 (returns to the control flag "0").

Hence, the carrier synchronizing circuit 41 of FIG. 4 starts a frequency pull-in process for the residual frequency error $\Delta f'$ when the convergence state from the convergence determining circuit 82 is "3" and the residual frequency error Δf' becomes equal to or more than the start threshold value Th1, and ends the frequency pull-in process for the residual frequency error Δf' when the residual frequency error Δf' becomes equal to or less than the threshold value Th2.

In this case, the start threshold value Th1 is set to a value such that transmission quality begins to be degraded because of the presence of the residual frequency error Δf', and the end threshold value Th2 is set such that Th2≦Th1 in order to make feedback control have hysteresis.

While the pull-in rate of the residual frequency error Δf' can be controlled by a weighting integrator circuit 61 according to the weighting factor m in the frequency synchronizing unit 51, reducing a lower limit value of the weighting factor m (that is, making quantization precision finer) by giving too high a priority to the maintenance of acquisition of the PLL leads to an increase in circuit scale of the weighting integrator circuit 61 and further lengthens a convergence time before transmission quality is improved. Thus, depending on demands for the circuit scale and the convergence time, transient degradation in transmission quality due to the pulling in of the residual frequency error Δf' needs to be tolerated to some extent.

The carrier synchronizing circuit 41 in FIG. 4 limits the pulling in of the residual frequency error Δf' to cases where degradation in transmission quality becomes noticeable due to the residual frequency error Δf', using the start threshold value Th1 and the end threshold value Th2. Thereby, in a normal operating environment in which there is no fear of degradation in transmission quality, a redundant pull-in process can be stopped, and more stable transmission quality can be achieved.

Figure 5:
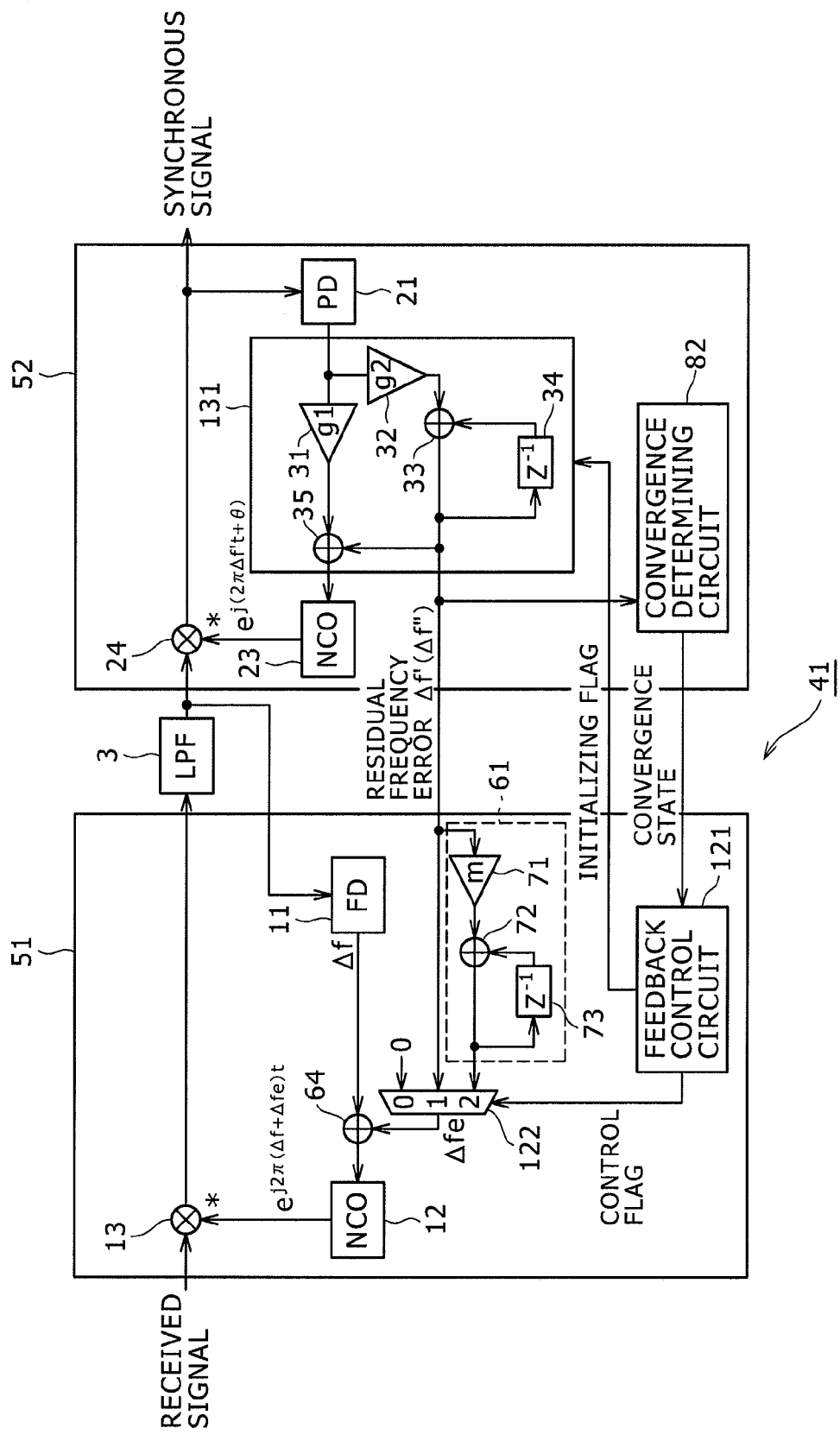
FIG. 5 is a block diagram showing an example of configuration of a third embodiment of a carrier synchronizing circuit to which the present embodiment is applied.

FIG. 5 shows an example of configuration of a third embodiment of a carrier synchronizing circuit to which the present embodiment is applied.

In FIG. 5, parts corresponding to those of the carrier synchronizing circuit 41 shown in FIG. 2 are identified by the same reference numerals, and description thereof will be omitted as appropriate.

In the carrier synchronizing circuit 41 of FIG. 5, a feedback control circuit 121 and a selector circuit 122 in a frequency synchronizing unit 51 and a loop filter 131 in a phase synchronizing unit 52 are different from the corresponding parts in the carrier synchronizing circuit 41 of FIG. 2.

The feedback control circuit 121 outputs a control flag "0" to the selector circuit 122 when a convergence state supplied from a convergence determining circuit 82 is "0" or "1". The feedback control circuit 121 outputs a control flag "2" to the selector circuit 122 when the convergence state supplied from the convergence determining circuit 82 is "3".

In addition, the feedback control circuit 121 outputs a control flag "1" to the selector circuit 122 and outputs an initializing flag "1" to the loop filter 131 for a period of one symbol period to a number of symbol periods when the convergence state supplied from the convergence determining circuit 82 becomes "2" for a first time after the carrier synchronizing circuit 41 starts a carrier synchronizing process for a received signal (the first time will be referred to as a start of one communication as appropriate). During other periods during which the convergence state "2" is supplied from the convergence determining circuit 82, the feedback control circuit 121 outputs a control flag "0" to the selector circuit 122 and outputs an initializing flag "0" to the loop filter 131. Hence, the feedback control circuit 121 next sets the control flag and the initializing flag to "1" when the convergence state becomes "2" in a next reception after the communication is once ended (disconnected).

In this case, the initializing flag "1" represents an instruction to initialize the phase error, and the initializing flag "0" represents an instruction not to initialize the phase error. A residual frequency error Δf' output from the loop filter 131 to the frequency synchronizing unit 51 when the convergence state supplied from the convergence determining circuit 82 to the feedback control circuit 121 becomes "2" at a start of one communication will be expressed as Δf''.

The selector circuit 122 outputs "0" to an adder 64 when the control flag supplied from the feedback control circuit 121 is "0". When the control flag supplied from the feedback control circuit 121 is "1", the selector circuit 122 outputs the residual frequency error Δf' supplied from the loop filter 131 in the phase synchronizing unit 52 to the adder 64. In this case, as described above, the feedback control circuit 121 outputs the control flag "1" to the selector circuit 122 when the convergence state "2" at a start of one communication is supplied from the convergence determining circuit 82. The residual frequency error Δf' when the convergence state "2" at a start of one communication is supplied from the convergence determining circuit 82 is Δf''. Hence, when the control flag supplied from the feedback control circuit 121 is "1", the selector circuit 122 outputs the residual frequency error Δf'' supplied from the loop filter 131 in the phase synchronizing unit 52 to the adder 64 as it is.

When the control flag supplied from the feedback control circuit 121 is "2", the selector circuit 122 outputs an output of a weighting integrator circuit 61, that is, a weighted integrated value Δfe to the adder 64.

As with the loop filter 81 in the first embodiment, the loop filter 131 averages a phase error (2πΔf't+θ), and then outputs the result to a numerically controlled oscillator 23. In addition, the loop filter 131 outputs the residual frequency error Δf' to the convergence determining circuit 82 and the frequency synchronizing unit 51. However, when the initializing flag "1" is supplied from the feedback control circuit 121, the loop filter 131 initializes (resets) the phase error (2πΔf't+θ) to be output to the numerically controlled oscillator 23. While the loop filter 131 is initialized (reset), the phase error supplied to the numerically controlled oscillator 23 is zero.

Hence, a configuration in a case where the feedback control circuit 121 supplies the control flag "0" to the selector circuit 122 and the selector circuit 122 outputs "0" to the adder 64 is similar to a configuration in a case where the feedback control circuit 62 supplies the control flag "0" to the selector circuit 63 in the first embodiment shown in FIG. 2. A configuration in a case where the feedback control circuit 121 supplies the control flag "2" to the selector circuit 122 and the selector circuit 122 outputs the weighted integrated value Δfe to the adder 64 is similar to a configuration in a case where the feedback control circuit 62 supplies the control flag "1" to the selector circuit 63 in the first embodiment shown in FIG. 2.

The operation of the carrier synchronizing circuit 41 of FIG. 5 will next be described.

The frequency synchronizing unit 51 and the phase synchronizing unit 52 start frequency pull-in and phase pull-in, and the convergence state supplied from the convergence determining circuit 82 to the feedback control circuit 121 becomes "0", . . . , "1", . . . Meanwhile, the control flag "0" is supplied from the feedback control circuit 121 to the selector circuit 122, and the initializing flag "0" is supplied from the feedback control circuit 121 to the loop filter 131.

When the convergence state "2" at a start of one communication is supplied from the convergence determining circuit 82 to the feedback control circuit 121 after passage of a predetermined time, the feedback control circuit 121 outputs the control flag "1" to the selector circuit 122, and outputs the initializing flag "1" to the loop filter 131.

Supplied with the control flag "1", the selector circuit 122 outputs the residual frequency error Δf" supplied from the loop filter 131 to the adder 64. Supplied with the initializing flag "1" from the feedback control circuit 121, the loop filter 131 initializes (resets) the phase error (2πΔf"t+θ) to be output to the numerically controlled oscillator 23.

Hence, to be exact, the feedback control circuit 121 does not output the control flag "1" and the initializing flag "1" in the same timing. Specifically, the control flag "1" is supplied from the feedback control circuit 121 to the selector circuit 122, the selector circuit 122 takes in the residual frequency error Δf" at that time from the loop filter 131, and thereafter the initializing flag "1" is output from the feedback control circuit 121 to the loop filter 131.

One to a number of symbol periods after the control flag "1" and the initializing flag "1" are supplied to the selector circuit 122 and the loop filter 131, respectively, the feedback control circuit 121 returns the control flag and the initializing flag to "0". A period of one symbol period to a number of symbol periods is a time taken for the frequency synchronizing unit 51 to complete pulling in the residual frequency error Δf".

Hence, a residual frequency error $\Delta f'_2$ supplied from the loop filter 131 when the control flag and the initializing flag are returned to "0" and the frequency synchronizing pull-in process and the phase synchronizing pull-in process are resumed is reduced by Δf" from the residual frequency error Δf' at the same time in the first embodiment ($\Delta f'_2 = \Delta f' - \Delta f''$).

Thereafter, the carrier synchronizing circuit 41 of FIG. 5 sets $\Delta f'_2$ as an initial value of the residual frequency error Δf', and performs a similar process to that of the carrier synchronizing circuit 41 in the first embodiment.

Specifically, when the convergence state supplied from the convergence determining circuit 82 becomes "3" after being "0", ..., "1", ..., "2", the control flag "2" is supplied from the feedback control circuit 121 to the selector circuit 122, the weighted integrated value Δfe of the residual frequency error Δf' in the phase synchronizing unit 52 is supplied to the adder 64, and frequency pull-in for (Δf+Δfe) is performed.

Effects of the carrier synchronizing circuit 41 in the third embodiment will be described.

In the foregoing first embodiment, when the frequency detection accuracy of the frequency synchronizing unit 51 is not very high, and the residual frequency error Δf' is larger than a certain amount, to pull in the residual frequency error while maintaining the phase synchronization of the PLL using the weighting integrator circuit 61 may take an enormous amount of time before the pull-in converges and the improvement of transmission quality is completed. When the weighting factor m of the weighting integrator circuit 61 is set higher to shorten a convergence time, there is a possibility of the feedback loop from the phase synchronizing unit 52 to the frequency synchronizing unit 51 becoming unstable and the process causing a divergence instead.

The carrier synchronizing circuit 41 in the third embodiment instantaneously performs frequency pull-in for the residual frequency error Δf" accumulated thus far before initial phase pull-in fully converges, and thereby reduces the residual frequency error to $\Delta f'_2$ at once. In addition, while the frequency pull-in for the residual frequency error Δf" is performed, by continuing supplying the loop filter 131 with the initializing flag "1", the phase synchronizing unit 52 is reset in an initial state, and operation of the phase synchronizing unit 52 is stopped. Then, when the initialization is cancelled at a point in time at which the frequency pull-in for the residual frequency error Δf" is completed, the phase pull-in of the phase synchronizing unit 52 is resumed as if the residual frequency error were $\Delta f'_2$ from the beginning.

For example, when a trigger of the convergence state (the convergence state "2") is set such that Δf" is 80 to 90 percent of a convergence value of Δf' in the first embodiment, due to the frequency pull-in for Δf", the phase pull-in of the phase synchronizing unit 52 can be resumed in a state in which the residual frequency error is reduced at once to 10 to 20 percent ($=\Delta f'_2$) of the residual frequency error Δf' in the first embodiment.

Thus, because the residual frequency error can be reduced greatly in the phase pull-in process, synchronization with a carrier can be established quickly and stably even when the frequency detection accuracy of the frequency synchronizing unit 51 is not very high.

Incidentally, in the case where the control flag is "2", the above-described third embodiment is configured to perform the process when the control flag in the first embodiment is "1". However, the third embodiment can be configured to perform the process when the control flag in the second embodiment is "1" instead.

As described above, the carrier synchronizing circuits 41 in the first to third embodiments feed back the residual frequency error Δf' detected by the phase synchronizing unit 52 to the frequency synchronizing unit 51 and perform frequency pull-in again for the residual frequency error Δf'. Therefore, even when a frequency drift in the local oscillator is large and even when the frequency detection accuracy of the frequency synchronizing unit 51 is not very high, it is possible to quickly and stably establish and maintain synchronism with a carrier without degrading transmission quality.

The above-described carrier synchronizing circuit 41 is used as a part of a sender or a receiver for wireless digital communication such for example as communication for portable telephones, satellite wave or terrestrial wave digital broadcasting, and wireless LAN (Local Area Network) communication.

Embodiments of the present invention are not limited to the above-described embodiments, and various changes can be made without departing from the spirit of the present invention.

What is claimed is:

1. A carrier synchronizing circuit including
   at least frequency synchronizing means and
   phase synchronizing means,
   wherein said phase synchronizing means includes
   residual frequency error detecting means for detecting a residual frequency error after a frequency synchronizing process by said frequency synchronizing means and supplying said residual frequency error to said frequency synchronizing means,
   convergence state determining means for determining a convergence state of phase pull-in on a basis of said residual frequency error detected by said residual frequency error detecting means, and
   wherein said frequency synchronizing means includes:
   a frequency error detector configured to provide a frequency error after filter processing to an adder, and
   frequency pull-in control means for obtaining a result of determination of said convergence state determining means, and determining whether to perform frequency pull-in for said residual frequency error,
   the frequency pull-in control means having three levels based upon the convergence state such that:

in a first level the frequency pull-in control means provides a 0 to the adder, in a second level the frequency pull-in control means provides the residual frequency error to the adder, and in a third level the frequency pull-in control means provides weighted value of the residual frequency error to the adder, and wherein said frequency synchronizing means performs frequency pull-in for said residual frequency error supplied from said residual frequency error detecting means after first timing.

2. The carrier synchronizing circuit according to claim 1, wherein said phase synchronizing means further includes weighting means for adding a predetermined weight to said residual frequency error supplied from said residual frequency error detecting means, and said frequency pull-in control means makes frequency pull-in for said residual frequency error weighted by said weighting means performed after said first timing in which said result of determination indicating that said residual frequency error has converged is obtained.

3. The carrier synchronizing circuit according to claim 2, wherein said frequency pull-in control means also obtains said residual frequency error detected by said residual frequency error detecting means, and makes frequency pull-in for said residual frequency error weighted by said weighting means performed from a time when said result of determination indicating that said residual frequency error has converged is obtained and said residual frequency error detected by said residual frequency error detecting means becomes equal to or more than a first threshold value to a time when said residual frequency error detected by said residual frequency error detecting means becomes equal to or less than a second threshold value equal to or less than said first threshold value.

4. The carrier synchronizing circuit according to claim 2, wherein said frequency synchronizing means further performs frequency pull-in for said residual frequency error supplied from said residual frequency error detecting means in second timing before said first timing, when frequency pull-in for said residual frequency error is performed in said second timing, said frequency pull-in control means makes frequency pull-in for said residual frequency error not weighted by said weighting means performed, and said phase synchronizing means performs phase error initialization until the frequency pull-in started in said second timing is completed.

5. The carrier synchronizing circuit according to claim 1, wherein said first timing is timing in which variation in said residual frequency error supplied from said residual frequency error detecting means becomes equal to or less than a predetermined value.

6. The carrier synchronizing circuit according to claim 1, wherein said first timing is timing in which a predetermined time has passed after a start of phase pull-in by said phase synchronizing means.

7. A carrier synchronizing method of a carrier synchronizing circuit, said carrier synchronizing circuit including at least a frequency synchronizing unit and a phase synchronizing unit, said carrier synchronizing method comprising the steps of:

in said phase synchronizing unit, detecting a residual frequency error after frequency synchronization by said frequency synchronizing unit and supplying said residual frequency error to said frequency synchronizing unit; and determining a convergence state of phase pull-in on a basis of said residual frequency error, and in said frequency synchronizing unit, providing a frequency error after filter processing to an adder, and determining whether to perform frequency pull-in for said residual frequency error based on the result of the determining a convergence state step, the determining whether to perform frequency pull-in having three levels based upon the convergence state such that:

in a first level a 0 is provided to the adder, in a second level the the residual frequency error is provided to the adder, and in a third level a weighted value of the residual frequency error is provided to the adder, and performing frequency pull-in for said residual frequency error supplied from said phase synchronizing unit after predetermined timing.

8. A carrier synchronizing circuit including at least a frequency synchronizing section and a phase synchronizing section, wherein said phase synchronizing section includes a residual frequency error detecting section configured to detect a residual frequency error after a frequency synchronizing process by said frequency synchronizing section and supply said residual frequency error to said frequency synchronizing section, and a convergence state determining section for determining a convergence state of phase pull-in on a basis of said residual frequency error detected by said residual frequency error detecting section, and wherein said frequency synchronizing section includes:

a frequency error detector configured to provide a frequency error after filter processing to an adder, and a frequency pull-in control section for obtaining a result of determination of said convergence state determining section and determining whether to perform frequency pull-in for said residual frequency error, the frequency pull-in control section having three levels based upon the convergence state such that:

in a first level the frequency pull-in control section provides a 0 to the adder, in a second level the frequency pull-in control section provides the residual frequency error to the adder, and in a third level the frequency pull-in control section provides weighted value of the residual frequency error to the adder, and wherein said frequency synchronizing section performs frequency pull-in for said residual frequency error supplied from said residual frequency error detecting section after first timing.

* * * * *